Patented Jan. 1, 1929.

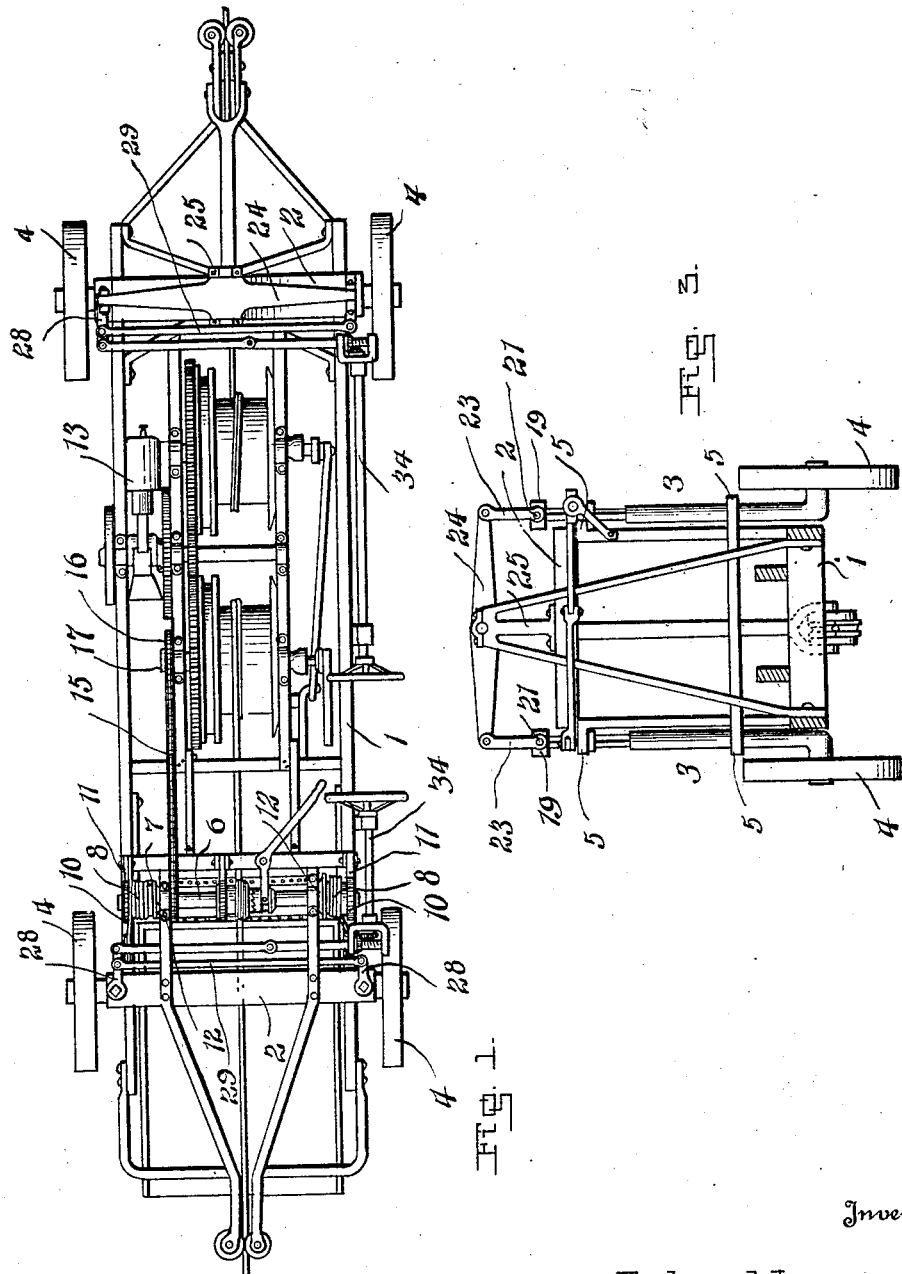

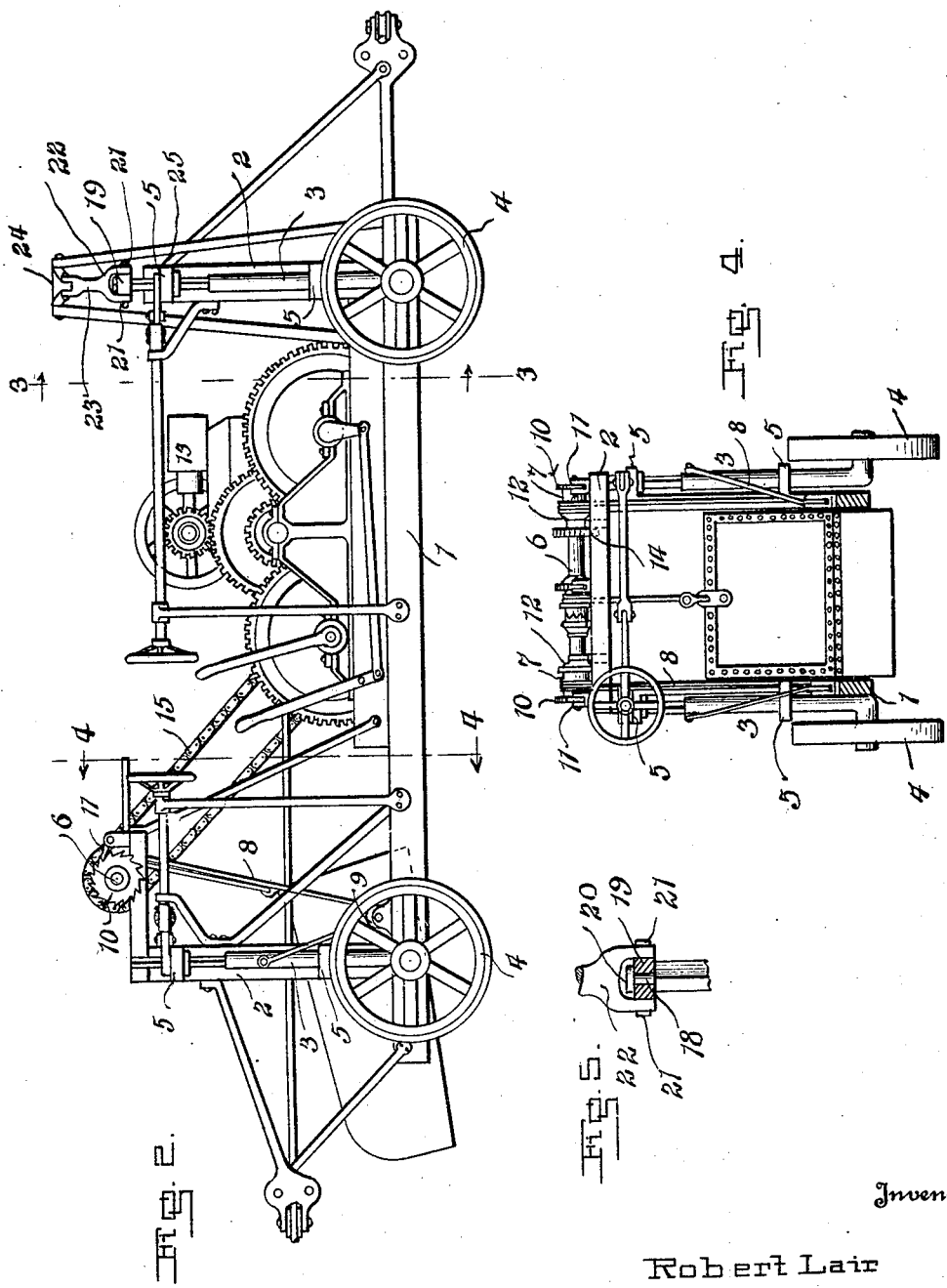

1,697,391

UNITED STATES PATENT OFFICE.

ROBERT LAIR, OF KINGSTON, WASHINGTON.

LEVELING MECHANISM.

Original application filed June 15, 1926, Serial No. 116,178. Divided and this application filed April 25, 1927. Serial No. 186,423.

The object of this invention is to provide means whereby an excavating machine may be maintained in a level condition, notwithstanding that it may be working upon a hillside or upon a surface which is not level, the present application being a division of an application filed by me June 15, 1926, Serial No. 116,178.

In the drawing:

Figure 1 is a plan view of a machine embodying my present invention.

Figure 2 is a side elevation of the same.

Figure 3 is a transverse section on the line 3—3 of Figure 2.

Figure 4 is a transverse section on the line 4—4 of Figure 2.

Figure 5 is a detail section.

At or near the opposite ends of the frame 1 are secured the upright frames 2 which will generally be of arched construction, as shown most clearly in Figures 3 and 4. Upon the sides of the vertical end frame 2 are mounted spindles 3 which carry ground wheels 4 at their lower ends so that the machine will be supported upon the ground and may readily travel thereover. The spindles 3 are vertically slidable in guides, indicated at 5, upon the outer sides of the respective end frames, and this sildable mounting of the spindles permits the wheels to assume any desired position vertically with respect to the main frame so that the frame will be supported at any desired height above the surface of the ground, and also permits the wheels to assume different vertical positions so that notwithstanding an inclination of the ground surface the frame will remain level. To adjust the front wheels, I provide a shaft 6 which is mounted in suitable bearings upon the upper end of the front arched frame 2 and upon the said shaft are loosely mounted drums 7 about each of which is wound a cable 8 which passes downwardly from the drum to and under a guide pulley 9 secured upon the main frame adjacent the front end thereof, as shown clearly in Figure 2, and then upwardly, the end of the cable being secured to the respectively adjacent spindle 3, as also shown in Figure 2. At the outer end of each drum 7 is a ratchet disk 10, and a pawl 11, pivoted upon the frame 2 in any convenient or preferred manner, cooperates with this ratchet to prevent reverse rotation of the drum so that after the cable has been wound to bring the frame into the desired position the withdrawal of the moving force will not result in a dropping of the frame but the frame will remain supported in the position in which it has been set. A clutch 12, which may be of any well-known type and is illustrated conventionally, is arranged to cooperate with each drum so that, when the cable is to be wound, the drum may be locked to the shaft 6 and, consequently, rotate with the shaft. If it be desired to lower the frame, all that needs to be done is to release the dog or pawl 11, whereupon the weight of the frame will cause the cable to unwind and permit descent of the frame. It will be understood that, if the surface of the ground be uneven, the wheel 4 at one side of the machine may be permitted to assume a lower position relative to the frame than the wheel at the opposite side so that the wheels will be accommodated to the inclination of the ground. The shaft 6 is rotated by the power of a motor, indicated conventionally at 13, and to effect the rotation of the shaft 6 a sprocket is secured thereon, as indicated at 14, and a chain 15 is trained around the said sprocket and around a sprocket 16 secured upon a shaft 17 upon the main frame which is geared to the motor. Of course, when the front end of the machine is adjusted to a level position in the manner described, it will be necessary to adjust the rear end of the frame likewise in order to overcome torsional strain and prevent twisting of the frame, and this leveling or adjustment of the rear end of the frame is accomplished automatically. The spindles 3 at the rear end of the machine are similar to the spindles 3 at the front end thereof and are mounted in guides 5 in the same manner. The upper extremities of the rear spindles, however, are equipped with pins or studs 18 which are disposed vertically axially of the respective spindles and are fitted loosely through collars 19, the extremities of the pins or pintles being upset, as indicated at 20, whereby endwise movement of the spindles relative to the collars will be prevented but the spindles may move pivotally in the collars. Each collar 19 is provided with trunnions 21 at diametrically opposite points of its outer circumference and upon these trunnions is pivotally engaged a fork or yoke 22 at the lower end of a link 23, the upper end of each link being pivoted to the end of a walking beam 24 which is fulcrumed midway its ends in or upon a pedestal 25 erected upon the adjacent end frame 2 at the top thereof, as will be understood.

Cranks 28 are fitted to the several spindles and a link 29 connects the cranks at the same end of the machine while a steering shaft 34 is mounted on the side of the machine and geared to one of the cranks to turn the spindles and effect steering.

Having thus described the invention, I claim:

An excavating machine comprising a frame, vertically disposed spindles slidably mounted upon the sides of the frame at the ends of the same, ground wheels carried by the lower ends of the spindles, a walking beam mounted upon the frame adjacent and between the upper ends of the spindles, links pivoted to the ends of the walking beam and having forked lower ends, and collars pivoted within the forked ends of the links and swiveled on the upper ends of the respective spindles.

In testimony whereof I affix my signature.

ROBERT LAIR. [L. S.]